US008775440B2

(12) United States Patent
Saxena

(10) Patent No.: US 8,775,440 B2
(45) Date of Patent: *Jul. 8, 2014

(54) METHOD AND SYSTEM FOR ADAPTIVE PREFETCHING

(75) Inventor: Avinash C. Saxena, Plano, TX (US)

(73) Assignee: Parellel Networks, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/608,178

(22) Filed: Sep. 10, 2012

(65) Prior Publication Data

US 2013/0007016 A1    Jan. 3, 2013

Related U.S. Application Data

(63) Continuation of application No. 13/079,557, filed on Apr. 4, 2011, now Pat. No. 8,275,778, which is a continuation of application No. 11/534,971, filed on Sep. 25, 2006, now Pat. No. 7,921,117, which is a continuation of application No. 09/731,365, filed on Dec. 6, 2000, now Pat. No. 7,113,935.

(51) Int. Cl.
*G06F 7/00* (2006.01)
*G06F 17/30* (2006.01)

(52) U.S. Cl.
USPC .......................................... 707/748; 711/133

(58) Field of Classification Search
USPC ..................... 707/736, 748, 751; 711/133
See application file for complete search history.

(56) References Cited

U.S. PATENT DOCUMENTS

| 5,878,223 | A | 3/1999 | Becker et al. |
| 5,978,730 | A | 11/1999 | Poppen et al. |
| 6,023,726 | A | 2/2000 | Saksena |
| 6,038,601 | A | 3/2000 | Lambert et al. |
| 6,055,569 | A | 4/2000 | O'Brien et al. |
| 6,067,565 | A | 5/2000 | Horvitz |
| 6,085,226 | A | 7/2000 | Horvitz |
| 6,098,064 | A | 8/2000 | Pirolli et al. |
| 6,111,536 | A | 8/2000 | Richards et al. |
| 6,128,701 | A | 10/2000 | Malcolm et al. |
| 6,131,110 | A | 10/2000 | Bates et al. |
| 6,154,767 | A | 11/2000 | Altschuler et al. |
| 6,182,133 | B1 | 1/2001 | Horvitz |
| 6,415,368 | B1 | 7/2002 | Glance et al. |
| 6,507,872 | B1 | 1/2003 | Geshwind |
| 6,549,896 | B1 | 4/2003 | Candan et al. |

(Continued)

FOREIGN PATENT DOCUMENTS

WO    WO 98/53410    11/1998

*Primary Examiner* — Jeffrey A Burke
(74) *Attorney, Agent, or Firm* — Baker Botts L.L.P.

(57) ABSTRACT

A cache server prefetches one or more web pages from an origin server prior to those web pages being requested by a user. The cache server determines which web pages to prefetch based on a graph associated with a prefetch module associated with the cache server. The graph represents all or a portion of the web pages at the origin server using one or more nodes and one or more links connecting the nodes. Each link has an associated transaction weight and user weight. The transaction weight represents the importance of the link and associated web page to the origin server and may be used to control the prefetching of web pages by the cache server. The user weight may be used to change a priority associated with a request for a web page. The user weight and transaction weight may change based on criteria associated with the origin server.

20 Claims, 2 Drawing Sheets

(56) References Cited

U.S. PATENT DOCUMENTS

| | | |
|---|---|---|
| 6,654,742 B1 | 11/2003 | Kobayashi et al. |
| 6,854,018 B1 | 2/2005 | Li et al. |
| 6,871,218 B2 | 3/2005 | Desai et al. |
| 6,874,019 B2 | 3/2005 | Hamilton, II et al. |
| 6,993,591 B1 | 1/2006 | Klemm |
| 7,051,074 B1 | 5/2006 | Buchsbaum et al. |
| 7,165,147 B2 | 1/2007 | Ting et al. |
| 7,921,117 B2 * | 4/2011 | Saxena ......................... 707/748 |
| 8,275,778 B2 * | 9/2012 | Saxena ......................... 707/748 |
| 2001/0000083 A1 | 3/2001 | Crow et al. |
| 2007/0022102 A1 * | 1/2007 | Saxena ........................... 707/3 |
| 2011/0185004 A1 * | 7/2011 | Saxena ......................... 709/201 |

* cited by examiner

METHOD AND SYSTEM FOR ADAPTIVE PREFETCHING

CROSS REFERENCE TO RELATED APPLICATIONS

This application is a continuation of U.S. application Ser. No. 13/079,557 filed Apr. 4, 2011 and now U.S. Pat. No. 8,275,778, which is a continuation of U.S. application Ser. No. 11/534,971 filed Sep. 25, 2006 and now U.S. Pat. No. 7,921,117, which is a continuation of U.S. application Ser. No. 09/731,365 filed Dec. 6, 2000 and now U.S. Pat. No. 7,113,935, all of which are hereby incorporated by reference herein.

TECHNICAL FIELD OF THE INVENTION

This invention relates in general to data processing systems and, more particularly, to a method and apparatus for adaptive prefetching.

BACKGROUND OF THE INVENTION

As computers have grown increasingly important in today's society, the importance of public and private networks and, especially, the Internet has also increased. As increasing numbers of users access the Internet, the need for efficient use of bandwidth has also increased. The increasing numbers of requests handled by the Internet are increasing the delay experienced by a user between generating a request and receiving a response to the request because of bandwidth limitations.

One traditional solution to decreasing overall bandwidth usage and decreasing the delay experienced by the user has involved caching previously requested content at the user's computer for faster retrieval. A related traditional solution has involved caching previously requested content for multiple users at a single cache server. Another traditional solution has involved increasing the bandwidth of the network connection between the Internet, the user and the web servers handling the requests. However, traditional solutions have often failed as the number of requests continue to increase and overload single cache servers and because of the expense associated with maintaining large numbers of high speed connections to the Internet. In addition, traditional solutions have often failed to provide for the distinguishing the relative importance of web pages.

SUMMARY OF THE INVENTION

Other embodiments, technical advantages, features, and aspects will be apparent to one of ordinary skill in the art from the following figures, descriptions, and claims. One aspect of the present invention involves a method for data processing comprising receiving a web page request. The web page request requests a first web page. The first web page is associated with an origin server. The method further comprises associating the first web page with a first node in a prefetch graph and associating a respective second node in the prefetch graph with each of a plurality of second web pages associated with the first web page. The method further comprises generating at least one link in the prefetch graph between the first node and each of the second nodes. Each link has a respective associated user weight and a respective associated transaction weight. The method further comprises selecting at least one of the second web pages to retrieve based on the graph, and storing the selected second web pages at a cache server.

Another aspect of the present invention involves a method for data processing comprising receiving a web page request for a first web page. The web page request has an associated origination web page. The method further comprises associating an origination node in a prefetch graph with the origination web page and associating a first node in the prefetch graph with the first web page. The first web page is associated with the origination web page. The method further comprises updating a first link between the origination node and the first node. The first link has an associated first user weight and an associated first transaction weight. The method further comprises associating a second node in the prefetch graph with each of a plurality of second web pages associated with the first web page and generating a respective second link in the prefetch graph between the first node and each of the second nodes. Each second link has an associated second user weight and an associated second transaction weight. The method further comprises selecting a second web page to retrieve based on the transaction weight, and storing the second web page at a cache server.

A further aspect of the present invention involves a system for data processing comprising a memory coupled to a processor and an application stored in the memory. The application is operable to receive a web page request for a first web page. The web page request has an associated origination web page. The application is further operable to associate an origination node in a prefetch graph with the origination web page and associate a first node in the prefetch graph with the first web page. The first web page is associated with the origination web page. The application is further operable to associate a first link in the prefetch graph with a hypertext link from the origination web page to the first web page and associate a transaction weight with the first link based on prefetch criteria associated with an origin server associated with the prefetch graph. The application is further operable to associate a user weight with the first link based on the prefetch criteria, retrieve the first web page, and store the first web page.

The present invention provides various technical advantages. Various embodiments of the invention may have none, some, or all of these advantages. One such technical advantage is the capability for prefetching web pages from an origin server to a cache server and storing the prefetched web pages at the cache server. In addition, the web pages may be prefetched and stored at the user's computer. Prefetching of web pages can provide a user increased performance by providing the requested web page from the cache server and/or the user's computer instead of the origin server. Another technical advantage is the capability of the cache server to maintain a graph of web pages and hypertext links associated with the origin server. A transaction weight and a user weight may be associated with links between the web pages on the origin server. The transaction weight may be used to control the prefetching of the web pages by the cache server. The user weight may be used to increase or decrease the priority associated with a request for a web page from the origin server. Yet another technical advantage is the capability to update the user and transaction weights depending on criteria specified by an administrator associated with the origin server. For example, the transaction weight and/or user weight associated with a hypertext link may be increased or decreased in response to the popularity of the web page or the relative importance of the link.

BRIEF DESCRIPTION OF THE DRAWINGS

A better understanding of the present invention can be realized from the detailed description that follows, taken in conjunction with the accompanying drawings, in which.

DETAILED DESCRIPTION OF THE INVENTION

Figure 1:
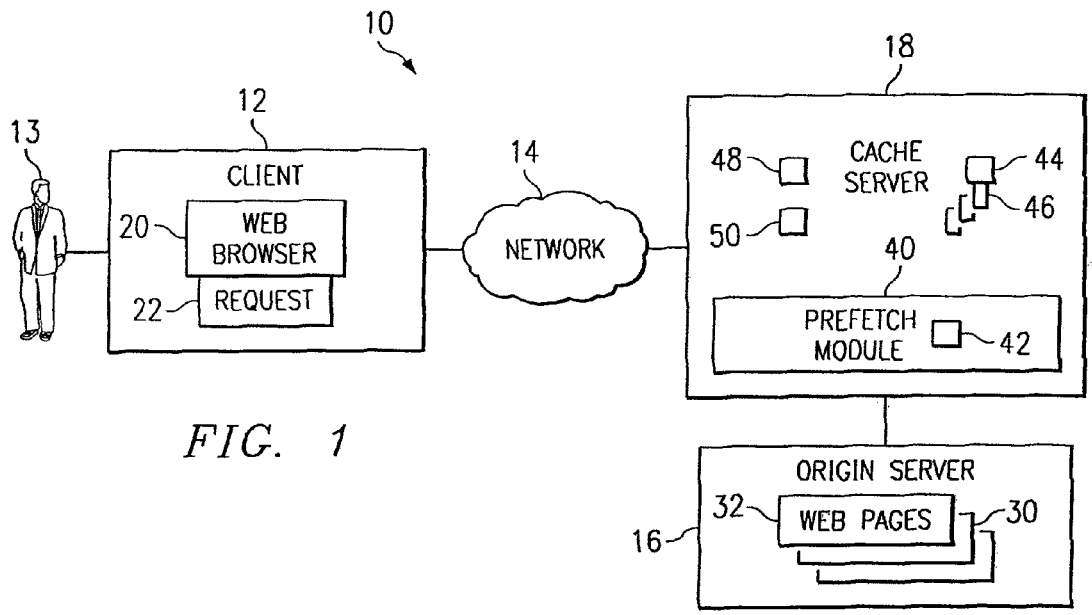
FIG. 1 is a block diagram illustrating a cache system with adaptive prefetch capabilities.

FIG. 1 is a block diagram illustrating a cache system 10 with adaptive prefetch capabilities. System 10 comprises a client 12, a user 13, a network 14, an origin server 16, and a cache server 18.

Client 12 comprises any suitable general purpose or specialized computer operable to support execution of a web browser 20. Client 12 is coupled to network 14. User 13 comprises a human user or automated process associated with client 12 and web browser 20.

Browser 20 is executed on client 12 and comprises any suitable Hypertext Transport Protocol (HTTP) client. In the disclosed embodiment, browser 20 comprises a web browser such as Internet Explorer® by Microsoft Corp. of Redmond, Wash., or Netscape Communicator by Netscape Communications Corp. of Mountain View, Calif. Browser 20 transmits and receives data over network 14. Browser 20 is operable to generate one or more requests 22.

Request 22 comprises a request for an item of content from origin server 16. More specifically, request 22 may use a uniform resource locator (URL). The URL identifies a particular origin server 16 by the Internet domain name associated with the origin server 16 and a web page 30 located at the origin server 16. the domain name and web page 30 identify the particular web page 30 request 22 is requesting. As used herein, an item of content ("content item") indicates a particular element of content, such as a particular web page, while content refers generally to data to be retrieved. The requested content item may further comprise multiple items of content, for example, a web page with multiple graphical elements, but request 22 indicates a single content item while the remaining items of content associated with the requested content item are retrieved as a function of the requested content item. Content may comprise static or dynamic audio data, video data, text data, multimedia data, hypertext markup language (HTML) data, binary data and any other suitable types of data capable of being used by client 12 or displayed by web browser 20. In the disclosed embodiment, requests 22 are HTTP requests for HTML data, such as a web page.

Network 14 comprises any suitable data network system for communicating data between computer systems. For example, network 14 may comprise the Internet, an asynchronous transfer mode (ATM) network, an Ethernet network, a Transmission Control Protocol/Internet Protocol (TCP/IP) network, an intranet or any other suitable computer networking technologies in any combination. For purposes of teaching the present invention, an exemplary embodiment will be described where network 14 comprises the publicly accessible interconnection of computer networks commonly known as the Internet.

Origin server 16 comprises any suitable hardware and/or software executing on a computer for receiving and responding to requests 22. Origin server 16 may comprise a single computer executing software or may comprise a plurality of computers each executing software. In the disclosed embodiment, origin server 16 comprises an HTTP server which may also be known as a web server. Origin server 16 may additionally support other protocols such as the file transfer protocol (FTP). Origin server 16 may retrieve information from local data sources and/or remote data sources in response to requests 22. Origin server 16 may be operable to retrieve static content, such as pre-written text files, images and web pages, from the data sources in response to requests 22. Origin server 16 may also be operable to generate new, dynamic content, for example, by dynamically creating web pages based on content stored at the data sources, in response to requests 22. For example, origin server 16 may generate a new web page using a common gateway interface (CGI) script, generate a new web page from the result of a structured query language (SQL) request and perform other suitable content generation functions in response to requests 22. Origin server 16 may also be operable to generate executable software, such as applications and applets, in response to requests for data. For example, origin server 16 may generate a Java applet in response to an appropriate request 22.

Origin server 16 also comprises one or more web pages 30. Web pages 30 each comprise a content item identified by a URL and having one or more items of content associated with it. For example, a particular web page 30 may have graphics, text, animations, applets, and other types of data and multimedia information associated with it. Origin server 16 also comprises a requested web page 32. Requested web page 32 comprises a particular one of the web pages 30 requested by request 22.

Cache server 18 caches content for transmission to web browsers 20 in response to requests 22. Cache server 18 responds to requests 22 from browser 20 by intercepting request 22 and providing the requested web page or other content item to browser 20 using network 14. By responding to requests 22 at cache server 18, the processing and network load at origin server 16 is decreased and user 13 receives more efficient and faster service. Cache servers 18 cache web pages 30 from origin server 16. Cache servers 18 provide current, cached content items originally available from origin server 16 to browser 20 in response to requests 22. In the disclosed embodiment, a single cache server 18 is shown as communicating with a single origin server 16, however, multiple cache servers 18 may be used and be operable to communicate with and provide service to a plurality of origin servers 16.

Cache server 18 further comprises a prefetch module 40. Prefetch module 40 comprises a suitable combination of software and/or hardware operable to retrieve web pages 30 from origin server 16. Prefetch module 40 operates to generate a logical graph 42 associated with an origin server 16 and use the graph 42 to determine which web pages 30 to prefetch from origin server 16 to cache server 18. More specifically, graph 42 is a logical construct that allows examination and relative weighting of relationships between web pages 30 on a particular origin server 16. Graph 42 is described in more detail in association with FIG. 2. Graph 42 comprises a directed graph having one or more ways associated with edges connecting nodes in the graph 42. Each node comprises a web page and each edge comprises a link from one web page 30 to another web page 30.

Cache server 18 also comprises priority criteria 44. Priority criteria 44 is used by cache server 18 to associate a priority 46 with each request 22. Priority criteria 44 may be used by cache server 18 to determine priority 46 associated with request 22. For example, priority criteria 44 may associate priority 46 with request 22 based on the particular requested web page 32. For example, if requested web page 32 comprises a "buy" web page 30 at origin server 16, request 22 may be given a higher priority 46 than a request 22 for a "contact information" web page. By associating priorities with request 22, cache server 18 and origin server 16 may provide more efficient service to important requests while supplying relatively slower service to less important requests 22. Priority 46 comprises an indication of the importance of a particular request 22. Priority 46 may comprise an integer, a real number, an alphanumeric value, or any other suitable value operable to indicate a relative priority. Priority 46 may also indicate a relative increase or decrease to a priority already associated with request 22.

Cache server 18 may also utilize a prefetch threshold 48. Prefetch threshold 48 comprises a data construct operable to indicate which web pages 30 may be retrieved by prefetch module 40. More specifically, as cache server 18 becomes increasingly busy, cache server may use prefetch threshold 48 to impose a cut-off point when determining which web pages 30 to prefetch. Prefetch threshold 48 is described in more detail in association with FIG. 2.

Cache server 18 may also comprise site criteria 50. Site criteria 50 comprises configuration information associated with origin server 16. For example, site criteria 50 may indicate how graph 42 is to be generated for origin server 16 as well as other information associated with graph 42 and origin server 16.

In operation, user 13 at client 12 generates request 22 using browser 20 for content from origin server 16. More specifically, request 22 requests requested web page from origin server 16. Cache server 18 intercepts request 22 from web browser 20 before request 22 reaches origin server 16. For example, cache server 18 may intercept request 20 by having a domain name service (DNS) server associated with origin server 16 direct request 22 from the Internet domain associated with origin server 16 to cache server 18. Stated another way, request 22 addressed to the domain associated with origin server 16 may be routed to cache server 18 through the operation of a DNS server.

After receiving request 22, cache server 18 determines whether requested web page 32 is presently available at cache server 18. As used herein, a web page is "available" at cache server 18 when an unexpired copy of web page 30 presently exists at cache server 18. An unexpired web page 30 at cache server 18 comprises a copy of a web page 30 available from origin server 16 that is the same as the web page 30 originally available from origin server 16. Stated another way, an unexpired web page at cache server 18 comprises a copy of a web page 30 on origin server 16 which has not changed at origin server 16 since the copy was made at cache server 18. A number of conventional suitable methods may be used to synchronize and expire web pages 30 at cache server 18.

If requested web page 32 is available at cache server 18, then cache server 18 communicates requested web page 32 to client 12. If requested web page 32 is not available at cache server 18, then cache server 18 retrieves requested web page 32 from origin server 16 and communicates requested web page 32 to client 12. Cache server 18 also determines whether requested web page 32 retrieved from origin server 16 is cacheable, and, if requested web page 32 is cacheable, caches requested web page 32 at cache server 18.

After communicating requested web page 32 to client 12, cache server 18 uses prefetch module 40 to determine which web pages 30, if any, to prefetch from origin server 16. By prefetching web pages 30 from origin sever 16, cache server 18 is attempting to provide increased responsiveness to user 13. Prefetching web pages 30 comprises retrieving web pages 30 from origin server 16 before the web pages 30 are requested by user 13. Instead of reacting to requests 22 and caching only requested web pages 32, prefetch module 40 uses graph 42 to attempt to predict which web pages 30 user 13 is likely to select next. Prefetch module 40 can then retrieve web pages 30 from origin server 16 before user 13 requests the web page 30. User 13 then experiences decreased delay when retrieving web pages 30 because the web pages have already been cached at cache server 18. When origin server 16 is a popular site and multiple cache servers 18 are used, a significant performance increase may be experienced by user 13 as the processing and network load at origin server 16 is decreased and spread among cache servers 18. For example, a prefetch of a "check out" page or a "further information" page for an item may increase the performance experienced by the user when the user requites these prefetched pages. The particular web pages prefetched may be selected as they are relatively more important to origin server 16 than other web pages because users may tend to be more likely to make a purchase when the prefetched web pages are requested by the user.

Cache server 18 then examines graph 42 associated with origin server 16 to which request 22 is directed. Graph 42 may modify priority 46 associated with request 22. For example, priority 46 of request 22 may be increased or decreased. By changing priority 46 associated with request 22, prefetch module 40 may use information available from graph 42 to provide increased service to users 13 requesting high priority web pages 30 and decreased service to users 13 requesting low priority web pages 30. In general, graph 42 allows priority 46 to be changed based on the particular requested web page 32 user 13 is requesting and web page 30 from which user 13 selected web page 32.

In addition, prefetch module 40 may pre-load web pages linked to requested web page 32 based on graph 42, priority 46 and threshold 48. More specifically, prefetch module 40 determines whether related web pages are already cached at cache server 18 and may then retrieve one or more uncached related web pages 30.

Figure 2:
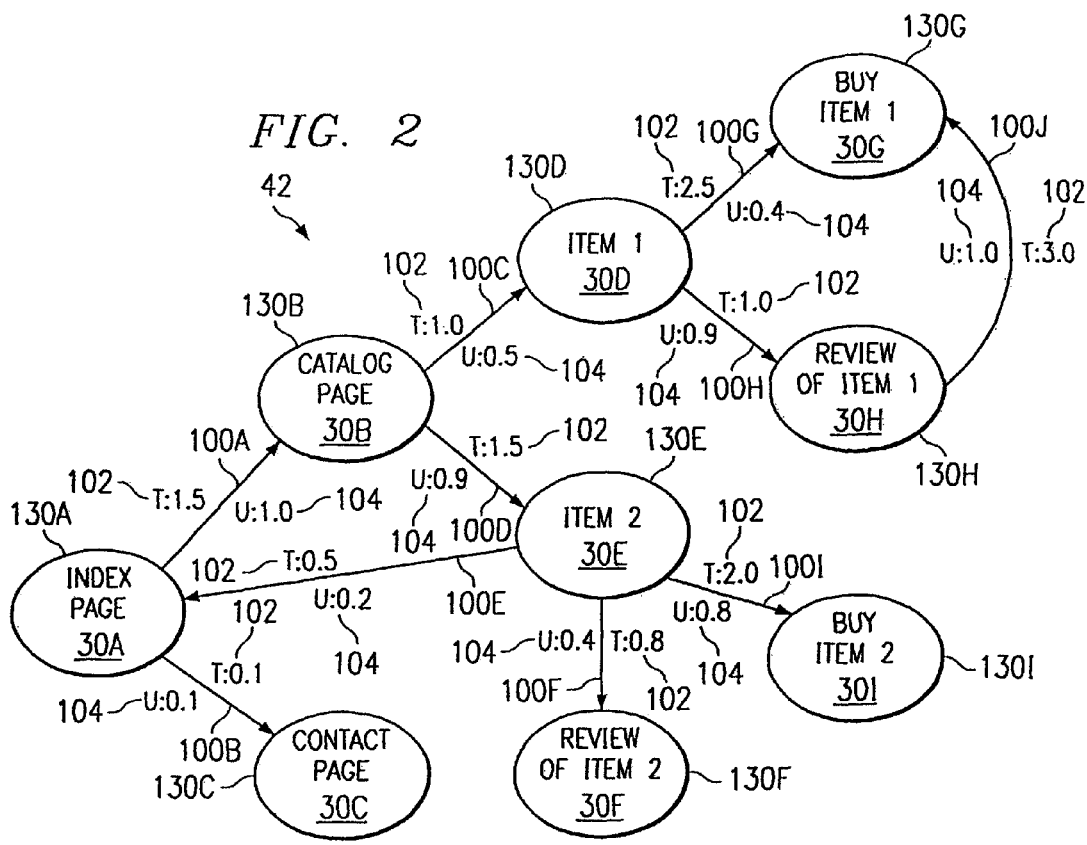
FIG. 2 is a graph illustrating an exemplary embodiment of a graph used in association with the system of FIG. 1.

FIG. 2 is a graph illustrating an exemplary embodiment of graph 42. Graph 42 comprises a plurality of nodes 130A, 130B, 130C, 130D, 130E, 130F, 130G, 130H, and 130I, and a plurality of links 100A, 100B, 100C, 100D, 100E, 100F, 100G, 100H, 1001, and 100J. For increased clarity, links may be referred to generically as "link 100" while links 100A-J represent the particular links shown in FIG. 2. Similarly, nodes may be referred to generically as "node 130" while nodes 130A-I represent the particular nodes in FIG. 2. Each node 130A-I has a respective associated web page 30A, 30B, 30C, 30D, 30E, 30F, 30G, 30H and 30I. For example, node 130A has an associated web page 30A representing an index page. Each link 100 is respectively associated with a hypertext link between web pages 30. For example, link 100A between node 130A and node 130B indicates a link from web page 30A node 30A to web page 30B.

Each link 100 also comprises an associated transaction weight 102 and an associated user weight 104. Transaction weight 102 comprises an indication of the importance of the link to an administrator associated with origin server 16. More specifically, transaction weight 102 indicates the relative importance of hypertext links associated with links 100 in graph 42. Transaction weight 102 may be used by prefetch module 40 to determine which pages 30 to prefetch and in what order to prefetch web pages 30. Transaction weight 102 may comprise a numeric or other indication of the weight. In one embodiment, transaction weight 102 comprises a real number.

User weight 104 comprises an indication of how to modify the priority of request 22 based on the link 100 associated with request 22. More specifically, the priority associated with user 13 may be increased or decreased based on user weight 104. The increase or decrease may be determined by the administrator associated with origin server 16 based on the importance of the link 100. For example, link 100 between node 30A and node 30B indicates a user weight of 1.0 which may be used to indicate no change in the user's priority. For another example, link 100 between index page 30A and contact page 30C indicates a user weight 104 of 0.1 which may indicate a decrease in the priority associated with user 13 because the administrator associated with origin server 16 does not consider contact page 30C to be a high priority page 30. Criteria 50 may be used to indicate weights 102 and 104 for a particular origin server 16.

User weight 104 may comprise any suitable indication of the priority associated with link 100. In the exemplary embodiment of FIG. 2, user weight 104 is a real number indicating a magnitude of change in priority 46 by link 100.

Graph 42 may be used to represent the organization of web pages 30 at an origin server 16. Using graph 42, module 40 can determine how important particular links 100 and web pages 30 are to origin server 16. More specifically, transaction weight 102 may be used to determine the importance of web pages 30 to origin server 16. This allows prefetch module 40 to prefetch important web pages 30 so that users 13 experience increased performance with respect to particular portions of origin server 16. For example, if origin server 16 is paying for caching services from cache server 18 based on the amount of data cached by cache server 18, then transaction weight 102 may be used by origin server 16 to restrict prefetching of web pages 30 to important web pages 30 associated with origin server 16, such as a product purchase confirmation page.

User weight 104 may also be used to represent the importance of a web page 30 or link 100. User weight 140 indicates the priority level for servicing request 22. For example, priority 46 associated with request 22 may be low for a particular user 13 because that user 13 browses often, but rarely buys, and user weight 140 may be used to raise priority 46 when user 13 selects a "buy product" link.

When user 13 selects a link 100, user weight 104 may modify priority 46 associated with request 22. More specifically, priority 46 associated with request 22 may be adjusted up or down based on user weight 104 which allows link 100 to specifically prioritize requests 22. For example, user weight 104 of 1.0 associated with link 100A may indicate no change in priority 46 while user weight 104 of 0.1 on link 100B may decrease priority 46 because contact page 30C is considered to be less important to an administrator associated with origin server 16 than a user wishing to view catalogue page 30B.

For example, request 22 may request index page 30A from origin server 16. After index page 30A has been returned to client 12, prefetch module 40 may then examine graph 42. If no graph 42 exists for origin server 16 associated with index page 30A, then prefetch module 40 may generate a new graph 42 for origin server 16. Generating a new graph 42 may be done incrementally or all-at-once. As origin server 16 may support a large number of web pages 30, the all-at-once approach may impose a significant burden on the processing capabilities and network bandwidth at origin server 16. For example, cache server 18 may have to retrieve a substantial portion of the web pages 30 at origin server in order to determine the relationships between the web pages 30 at origin server 16 and generate graph 42.

Origin server 16 may also choose to build graph 42 incrementally. For example, an incremental build of graph 42 may comprise only adding web pages 30 associated with origin server 16 to graph 42 that are linked to a retrieved web page 30. Referring to FIG. 2, when web page 30E is retrieved for the first time, the incremental build of graph 42 would then add web pages 30I and 30F to graph 42.

In addition, historical information may be used to build graph 42 in association with the incremental or fixed-interval methods of building graph 42. For example, logs created by origin server 16 may indicate which URLs and/or web pages 30 have been retrieved. Also, the logs may indicate when the web pages 30 have been retrieved which allows the order in which web pages 30 are retrieved to be determined.

In the disclosed embodiment, origin servers 16 are differentiated based on the domain name associated with the origin server 16 and a distinct graph 42 may be associated with each domain. Alternatively, prefetch module 40 may be configured to generate graphs 42 at any desired level of granularity, such as at the sub-domain level or the global top level domain (gTLD) level.

Prefetch module 40 then determines whether to prefetch catalogue page 30B and contact page 30C linked to index page 30A by links 100A and 100B respectively. Prefetch module 40 examines transaction weight 102 associated with links 100A and 100B. Any other suitable techniques may be used to determine which pages 30 to prefetch. Prefetch module 40 may then determine, based on transaction weight 102, whether to retrieve catalogue page 30B, contact page 30C or neither. More specifically, prefetch module 40 compares transaction weights 102 respectfully associated with links 100A and 100B. Prefetch module then determines whether transaction weight 102 for links 100A and 100B exceeds prefetch threshold 48. In FIG. 2, transaction weights 102 are shown as real numbers, however, integer values or other values may be used. Prefetch module 40 may also use transaction weights 102 as a modifier to another value. For example, cache server 18 and prefetch module may maintain prefetch threshold 48 for individual origin servers 16.

Prefetch threshold 48 may be based on the processing load, current bandwidth available or other relevant metrics currently being experienced by cache server 18. For example, when cache server 18 is experiencing heavy traffic, prefetch threshold 48 may increase so that fewer web pages 30 are being prefetched. Prefetch threshold 48 may also comprise multiple values, each individually associated with particular origin servers 16. For example, origin server 16 may want only high transaction weight items to be prefetched. For another example, prefetch threshold 48 for a particular origin server 16 may change based on the load currently being experienced by origin server 16. By decreasing the number of web pages 30 be prefetched, the processing load at cache server 18 or origin server 16 may be decreased. For example, prefetch threshold 48 may be 1.0, indicating that link 100A has a transaction weight 102 high enough for retrieval of catalogue page 30B, while link 100B does not have a transaction weight 102 high enough for prefetching of contact page 30C. Depending on the configuration of prefetch module 40, other web pages 30, such as 30D-I, may also be prefetched by prefetch module 40.

Weights 102 and 104 may also change over time. When graph 42 is initially generated for an origin server 16, default or initial weights 102 and 104 may be assigned to links 100. As users 13 retrieve web pages 30 from origin server 16, criteria 50 associated with origin server 16 may indicate how to update weights 102 and/or 104 based on the pages 30 retrieved by users 13. For example, criteria 50 may indicate that weights 102 and/or 104 be increased when a particular page is retrieved a certain number of times. For another example, criteria 50 may indicate that a link 100 which has not been selected for a certain period of time has the associated transaction weight 102 decreased. Also, criteria 50 may place increased importance on web pages 30 that result in a particular outcome. For example, on an electronic commerce web site, a web page 30 which results in a final "buy" transaction may be given increased weight because an item has been purchased previously from that web page 30. In general, a variety of suitable criteria 50 may be used to determine how to increase and/or decrease weights 102 and/or 104 for particular origin servers 16.

Figure 3:
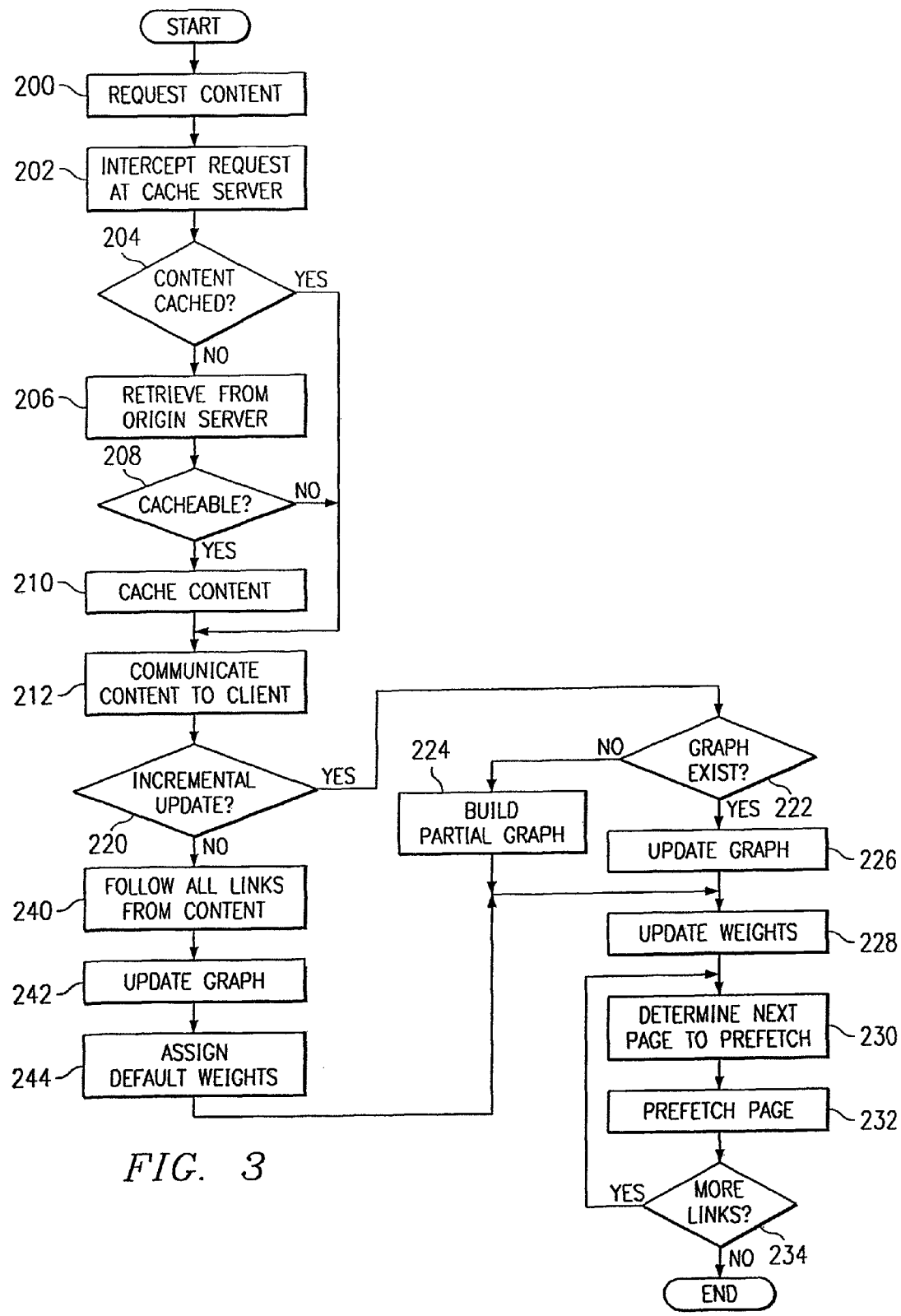
FIG. 3 is a flow chart illustrating a method for providing prefetching of web pages by a cache server using the system of FIG. 1.

FIG. 3 is a flow chart illustrating a method for providing prefetching of web pages 30 by a cache server 18. The method begins at step 200 where user 13 generates a request 22 for requested web page 32 using web browser 20. Next, at step 202, request 22 is communicated over network 14 and intercepted by cache server 18. Then, at decisional step 204, cache server 18 determines whether requested web page 32 is cached. If requested web page 32 is not cached then the NO branch of decisional step 204 leads to step 206 where requested web page 32 is retrieved from origin server 16. Proceeding to decisional step 208, cache server 18 determines whether requested web page 32 is cacheable. If requested web page 32 is cacheable then the YES branch of decisional step 208 leads to step 210. At step 210, the requested web page 32 is cached at cache server 18. If cache server 18 determines at step 208 that requested web page 32 is not cacheable, then the NO branch of step 208 leads to step 212.

Returning to step 204, if requested web page 32 was already cached at cache server 18, then the YES branch of decisional step 204 leads to step 212. At step 212, the requested web page 32 is communicated over network 14 to client 12 for display by web browser 22 to user 13.

Next, at decisional step 220, prefetch module 40 determines whether origin server 16 is being graphed incrementally or on fixed intervals. More specifically, at decisional step 220, prefetch module 40 determines how graph 42 is to be updated for origin server 16. Incrementally updating graph 42 may comprise adding links 100 and nodes 130 as users 13 retrieve web pages 30 from the origin server 16 associated with graph 42. If updating of graph 42 is to be performed incrementally, then the YES branch of decisional step 220 leads to decisional step 222.

At decisional step 222, prefetch module 40 determines whether a graph 42 currently exists for origin server 16. If no graph 42 is currently associated with origin server 16 then NO branch of decisional step 222 leads to step 224. At step 224, a portion of graph 42 is generated. More specifically, a first node 130 is generated for graph 42 and associated with requested web page 32. Referring to FIG. 2, if the requested web page 32 was index page 30A, index page 30A would become the first node 130A of graph 42. In general, criteria 50 associated with origin server 16 may indicate where to begin building graph 42, retrieved web page 32 may be used as the starting point or any other suitable starting location may be used.

Returning to step 222, if graph 42 does exist for origin server 16 then the YES branch of decisional step 222 leads to step 226. At step 226, requested web page 32 is added to graph 42 associated with origin server 16. If requested web page 32 already exists in graph 42, then a new node may not be added. Links 100 associated with the newly added web page 32 are also added to graph 42. If requested web page 32 was already in graph 42, then requested web page 32 may be examined to determine if the links 100 associated with the retrieved web page 32 need to be updated. Referring to FIG. 2, if web page 30B has just been added to graph 42, then links 100C and 100D are added at step 226. Next, at step 228, weights 102 and 104 associated with links 100 are updated. More specifically, links 100 associated with the retrieved web page 30 may be updated in response to a retrieval of the web page 30. For example, links 100 to the retrieved web page 30 may have their transaction weight 102 increased because the web page 30 to which link 100 refers has become more popular. Referring to the example in FIG. 2, if web page 30D is retrieved, link 100C may have transaction weight 102 and/or user weight 104 increased or decreased in response to the retrieval of web page 30D. An administrator associated with origin server 16 and/or an administrator associated with cache server 18 may determine the criteria by which weights 102 and 104 are updated. For example, the administrator may configure prefetch module 40 to increase weights 102 and/or 104 by 0.1 after a particular web page 30 has been downloaded 100 times. More specifically, nodes 130 associated with web pages 30 have which have not yet been added to graph 42 may be added in step 242. Also, changes to the organization and number of web pages 30 at origin server 16 may be handled at step 226. For example, new web pages 30 may be added, old web pages 30 may be deleted, and links 100 between web pages 30 may change.

For example, user 13 retrieves an origination web page and module 40 generates an origination node in graph and associates the origination node with the origination web page. Hypertext links associated with the origination web page are added as links 100 from the origination node. One or more further web pages associated with the hypertext links may then be added to graph 42 as nodes. More specifically, links 100 are added from the origination node to the nodes associated with the further web pages linked to from the origination node. Weights 102 and 104 may then be associated with links 100 based on criteria 50.

Proceeding to step 230, prefetch module 40 determines the next web page 30 to prefetch. Then, at step 232, the selected page is prefetched. More specifically, prefetch module 40 may maintain prefetch threshold 48 and retrieve web pages 30 linked to the retrieved web page 32 and having a transaction weight 102 greater than prefetch threshold 48. Next, at decisional step 234, prefetch module 40 determines whether more links 100 remain to be prefetched. If more web pages 30 exist to be prefetched then the YES branch of decisional step 234 returns to step 230. If no more web pages 30 currently exist to be prefetched then the NO branch of decisional step 234 is followed and the method ends. Prefetch module 40 may determine whether further web pages 30 remain to be prefetched by determining whether any links 100 are associated with the current web page 30 which have not yet been considered for prefetching. In general, any suitable technique may be used to determine if more web pages 30 exist to be prefetched.

Returning to step 220, if graph 42 is not to be updated in real time then the NO branch of decisional step 220 leads to step 240. At step 240, links 100 associated with retrieved web page 32 are followed until origin server 16 has been graphed. For example, when origin server 16 contracts for service from cache server 18, prefetch module 40 may build graph 42 by starting at an index page 30A associated with origin server 16 and recursively traversing all links 100 associated with index page 38 to build graph 42. Any suitable technique may be used for traversing links 100 and handling loops and other items. Then, at step 242, graph 42 is updated based on retrieved web page 32. More specifically, nodes 130 associated with web pages 30 have which have not yet been added to graph 42 may be added in step 242. Also, links 100 between web pages 30 may be added at step 242 to graph 42. Step 242 may be performed in order to handle changes to the organization and number of web pages 30 at origin server 16. For example, new web pages 30 may be added, old web pages 30 may be deleted, and links 100 between web pages 30 may change. Depending on criteria 50 associated with origin server 16, the update to graph 42 may begin at retrieved web page 32 and continue to web pages 30 linked to web page 32, may begin at a predetermined web page 30, such as web page 30A in FIG. 2, or at some other suitable web page 30 associated with origin server 16. Proceeding to step 244, links 100 without weights 102 and/or 104 may be assigned a default weight as indicated in criteria 50 as configured by an administrator associated with origin server 16 and/or cache server 18. As links 100 and web pages 30 are added or removed from graph 42, default weights 102 and 104 may be associated with newly added links 100 for use with prefetch module 40.

System 10 provides the capability for prefetching web pages from an origin server so that a user realizes increased performance. A cache server stores the prefetched web pages so that the user may receive requested web pages more quickly. For example, the cache server may be located "closer" to the user on the Internet so as to add less network related delay in responding to the user's request for a web page. By proactively retrieving web pages from the origin server, web pages may be cached before a user has ever requested the web page. In addition, by associating a transaction weight with links between web pages on the origin server, the importance of particular web pages and the order of the prefetching of the web pages may be controlled. Also, by adjusting a prefetch threshold associated with an origin server, some web pages may be prefetched while others are not based on the transaction weight. For example, an origin server being served by multiple cache servers may not want all of the web pages associated with the origin server to be prefetched and the origin server may set its prefetch threshold to exclude the prefetching of web pages with a low transaction weight.

A request for a web page may have a priority associated with the request, for example, to indicate the importance of the request or the user who generated the request. A user weight may also be associated with links between web pages at the origin server to change and/or vary the priority associated with a request. For example, a request with a low priority may be given a higher priority because of the particular web page the request is requesting.

In addition, the user and transaction weights may change depending on criteria specified by an administrator associated with the origin server. For example, the transaction weight and/or user weight associated with a hypertext link may be increased in response to a particular web page being retrieved. For another example, the transaction weight and/or user weight associated with a hypertext link may be decreased in response to a particular web page not being retrieved for a predetermined period of time.

Other changes, substitutions and alterations are also possible without departing from the spirit and scope of the present invention, as defined by the following claims.

What is claimed is:

1. A method for prefetching web pages, comprising:
retrieving a first web page at a cache server in response to a request for the first web page;
assigning a transaction weight to each of one or more second web pages linked to the retrieved first web page, the transaction weight indicating a relative importance of a particular web page by a source of the particular web page compared to other web pages at the source;
determining whether to prefetch and in what order the one or more second web pages linked to the retrieved first web page, wherein a second web page is prefetched when its transaction weight exceeds a prefetch threshold;
prefetching in order, prior to a request, those second web pages linked to the retrieved first web page whose transaction weight exceeds the prefetch threshold.

2. The method of claim 1, wherein the source of the one or more second web pages is one or more origin servers, each origin server having a different prefetch threshold associated therewith.

3. The method of claim 1, further comprising:
dynamically adjusting the prefetch threshold based on a processing load experienced at the cache server.

4. The method of claim 1, further comprising:
dynamically adjusting the prefetch threshold based on a current bandwidth available to the cache server.

5. The method of claim 1, further comprising:
increasing the prefetch threshold in response to increased traffic at the cache server.

6. The method of claim 1, further comprising:
dynamically adjusting the prefetch threshold is based on a processing load experienced at the source.

7. The method of claim 1, further comprising:
increasing a transaction weight for a particular page to be prefetched in response to the particular page being previously retrieved a set amount of times.

8. The method of claim 1, further comprising:
decreasing a transaction weight for a particular page to be prefetched in response to the particular page not being retrieved over a defined time period.

9. The method of claim 1, further comprising:
determining whether to update the transaction weight associated with a particular page in response to retrieval of the particular page.

10. A non-transitory computer readable storage medium including code for prefetching a web page, the code operable when executed to:
retrieve a first web page for a cache server in response to a request for the first web page;
assign a transaction weight to each of one or more second web pages linked to the retrieved first web page, the transaction weight indicating a relative importance of a particular web page by a source of the particular web page compared to other web pages at the source;
determine whether to prefetch and in what order the one or more second web pages linked to the retrieved first web page, wherein a second web page is prefetched when its transaction weight exceeds a prefetch threshold;
prefetch in order, prior to a request, those second web pages linked to the retrieved first web page whose transaction weight exceeds prefetch threshold.

11. The non-transitory computer readable storage medium of claim 10, wherein the code is further operable to:
dynamically adjusting the prefetch threshold based on any of a processing load experienced at the cache server, a current bandwidth available to the cache server, and a processing load experienced at the source.

12. The non-transitory computer readable storage medium of claim 10, wherein the code is further operable to:
increase the prefetch threshold in response to increased traffic at the cache server.

13. The non-transitory computer readable storage medium of claim 10, wherein the code is further operable to:
increase a transaction weight for a particular page to be prefetched in response to the particular page being previously retrieved a set amount of times.

14. The non-transitory computer readable storage medium of claim 10, wherein the code is further operable to:

decrease a transaction weight for a particular page to be prefetched in response to the particular page not being retrieved over a defined time period.

15. The non-transitory computer readable storage medium of claim 10, wherein the code is further operable to:

determine whether to update the transaction weight associated with a particular page in response to retrieval of the particular page.

16. A system for prefetching a web page, comprising:

means for retrieving a first web page for a cache server in response to a request for the first web page;

means for assigning a transaction weight to each of one or more second web pages linked to the retrieved first web page, the transaction weight indicating a relative importance of a particular web page by a source of the particular web page compared to other web pages at the source;

means for determining whether to prefetch and in what order the one or more second web pages linked to the retrieved first web page, wherein a second web page is prefetched when its transaction weight exceeds a prefetch threshold;

means for prefetching in order, prior to a request, those second web pages linked to the retrieved first web page whose transaction weight exceeds the prefetch threshold.

17. The system of claim 16, further comprising:

means for dynamically adjusting the prefetch threshold based on any of a processing load experienced at the cache server, a current bandwidth available to the cache server, a traffic level at the cache server, and a processing load experienced at the source.

18. The system of claim 16, further comprising:

means for increasing a transaction weight for a particular page to be prefetched in response to the particular page being previously retrieved a set amount of times.

19. The system of claim 16, further comprising:

means for decreasing a transaction weight for a particular page to be prefetched in response to the particular page not being retrieved over a defined time period.

20. The system of claim 16, further comprising:

means for determining whether to update the transaction weight associated with a particular page in response to retrieval of the particular page.

* * * * *

UNITED STATES PATENT AND TRADEMARK OFFICE
CERTIFICATE OF CORRECTION

PATENT NO.        : 8,775,440 B2  
APPLICATION NO.   : 13/608178  
DATED             : July 8, 2014  
INVENTOR(S)       : Saxena Page 1 of 1

It is certified that error appears in the above-identified patent and that said Letters Patent is hereby corrected as shown below:

On the title page item [73] should read:

Parallel Networks, LLC, Dallas, TX (US)

Signed and Sealed this
Fourteenth Day of October, 2014

Michelle K. Lee
*Deputy Director of the United States Patent and Trademark Office*